US012675036B2

(12) United States Patent
Zhu et al.

(10) Patent No.: US 12,675,036 B2
(45) Date of Patent: Jul. 7, 2026

(54) HEAT CONDUCTION UNIT FOR LIGHT VALVE AND PROJECTION DEVICE

(71) Applicant: SHENZHEN KEJINMING ELECTRONIC CO., LTD, Shenzhen (CN)

(72) Inventors: Xianxiong Zhu, Shenzhen (CN); Chunrong Fan, Shenzhen (CN); Changzheng Xu, Shenzhen (CN)

(73) Assignee: SHENZHEN KEJINMING ELECTRONIC CO., LTD, Shenzhen (CN)

( * ) Notice: Subject to any disclaimer, the term of this patent is extended or adjusted under 35 U.S.C. 154(b) by 331 days.

(21) Appl. No.: 18/372,154

(22) Filed: Sep. 25, 2023

(65) Prior Publication Data

US 2024/0288757 A1     Aug. 29, 2024

(30) Foreign Application Priority Data

Feb. 24, 2023   (CN) ......................... 202320306866.X
Apr. 27, 2023   (CN) ......................... 202310472218.6

(51) Int. Cl.
*G03B 21/16*          (2006.01)

(52) U.S. Cl.
CPC .................................. *G03B 21/16* (2013.01)

(58) Field of Classification Search
CPC ..................................................... G03B 21/16
See application file for complete search history.

(56) References Cited

U.S. PATENT DOCUMENTS

| | | | | | |
|---|---|---|---|---|---|
| 4,428,418 | A | * | 1/1984 | Beasley | F28F 1/32 165/182 |
| 10,514,594 | B2 | * | 12/2019 | Okada | G03B 21/16 |
| 2002/0088611 | A1 | * | 7/2002 | Geissler | F28D 7/16 165/158 |
| 2019/0271906 | A1 | * | 9/2019 | Okada | H04N 9/315 |
| 2020/0124951 | A1 | * | 4/2020 | Chang | G03B 21/16 |

FOREIGN PATENT DOCUMENTS

| | | | | | |
|---|---|---|---|---|---|
| CN | 110221506 | A | | 9/2019 | |
| CN | 111090214 | A | | 5/2020 | |
| CN | 113156754 | A | * | 7/2021 | ........... G03B 21/145 |
| CN | 215416248 | U | * | 1/2022 | |
| CN | 217279194 | U | | 8/2022 | |

* cited by examiner

*Primary Examiner* — Bao-Luan Q Le

(57) ABSTRACT

The present application provides a heat conduction unit for light valve and a projection device, used for conducting heat for light valve in the projection field. The tube set comprises a plurality of tubes, a central axis of the tube set is vertical or inclined to a surface of the tube upper cover or the tube lower cover, and the tube set is fixedly connected with the tube upper cover and the tube lower cover. And the materials of the tubes have good thermal conductivity. Tubes with good thermal conductivity are provided for the heat conduction unit and projection device. The structure is compact, the cost is reduced, and a good heat conduction effect is realized.

8 Claims, 7 Drawing Sheets

1

11          12

1

11          12

HEAT CONDUCTION UNIT FOR LIGHT VALVE AND PROJECTION DEVICE

CROSS REFERENCE TO RELATED APPLICATIONS

The present application claims the benefit of Chinese Patent Application Nos. 202320306866.X, filed on Feb. 24, 2023, titled "Heat conduction unit for light valve and projection device", and 202310472218.6 filed on Apr. 27, 2023, the contents of which are incorporated herein by reference in their entirety.

TECHNICAL FIELD

The present application relates to the technical field of projection, in particular to a heat conduction unit for light valve and a projection device.

BACKGROUND

With the development of projection technology, light valve is widely used in projectors. The types of light valve mainly include LCD (liquid crystal), LCOS (liquid crystal on silicon) and DMD (digital micromirror device). In recent years, with the demand of miniaturization, high brightness and high definition of projectors, the power consumption of projectors is increasing, and the light valve generates a lot of heat during the operation of projectors. Thus there is a high requirement for the projector to give consideration to both heat dissipation efficiency and cost. In the existing closed cooling system of LCD panel projector, the light valve is cooled by fin radiator.

Therefore, it is necessary to develop a heat conduction structure to solve the above technical problems.

SUMMARY

The present application provides a heat conduction unit for light valve and a projection device, aiming at solving the problem of high cost caused by adopting fins and semiconductor colling elements in a closed cooling system in the prior art.

The solutions are as followings. A heat conduction unit for light valve is provided, used for conducting heat for light valve, and the heat conduction unit includes a tube set, a tube upper cover and a tube lower cover; the tube set includes a plurality of tubes, a central axis of the tube set is vertical or inclined to a surface of the tube upper cover or the tube lower cover, and the tube set is fixedly connected with the tube upper cover and the tube lower cover. And the materials of the tubes have good thermal conductivity.

Further, the cross section of the tube is a closed shape, which may be any one of a circle, an ellipse, an equilateral triangle, a square, a rectangle, a rhombus, a parallelogram and a regular polygon, and may also be any one of a triangle, a quadrilateral, a polygon and a closed curve. The types of the closed shape are not limited, so long as it is beneficial to heat conduction.

Further, there are many ways to fixedly connect the tube set with the tube upper cover and the tube lower cover, such as welding the tube with the tube upper cover and the tube lower cover, or expanding or riveting the tube with the tube upper cover and the tube lower cover to realize interference fit connection.

Furthermore, the tube is made of metal with high thermal conductivity, including any one of aluminum, copper and aluminum alloy.

Further, the tube may also be made of polymer materials with high thermal conductivity, such as composite materials synthesized by resin and ceramic particles.

Further, a plurality of cross sections formed by the tube set on the surface of the tube upper cover or the tube lower cover are arranged in a matrix shape or a regular polygon shape; or a plurality of cross sections formed by the tube set on the surface of the tube upper cover or the tube lower cover are arranged in a ring shape.

As a further improvement of the above technical solution, an inner wall of the tube is provided with a plurality of grooves; or the inner wall of the tube is provided with a plurality of flaky protrusions extending along the center of the tube. Further, the groove is opened along the axial direction of the tube, and the cross section formed by the groove is a polygonal shape. By increasing groove, the area of inner surface of the tube is increased to better realize heat conduction.

Further, a projection device is provided, including the heat conduction unit described above.

Further, the projection device further includes a light source, a light valve, an external fan, an internal fan, a projection lens, an upper housing, a middle housing and a lower housing; the upper housing, the middle housing and the lower housing form an accommodating cavity, and the light valve and the heat conduction unit are arranged in the accommodating cavity;

the tube upper cover and the tube lower cover of the heat conduction unit face the upper housing and the lower housing respectively, inner walls of the plurality of tubes of the heat conduction unit are communicated with an accommodation area where the light valve is located and the accommodation area is sealed, and the internal fan is arranged between the lower housing and the tube lower cover; and outer walls of the plurality of tubes of the heat conduction unit are communicated with outside air, and the external fan is installed at a side of the middle housing facing the tube set.

Further, the internal fan is a vortex fan.

Further, the projection device further includes a temperature control board, a first temperature sensor arranged on the outer wall or the inner wall of the tube, and a second temperature sensor arranged on the light valve; and the first temperature sensor, the second temperature sensor and the external fan are electrically connected to the temperature control board, and the temperature control board intelligently adjusts a rotational speed of the external fan according to temperature parameters of the first temperature sensor and the second temperature sensor.

Further, the temperature control board is configured to determine a current working state of the projection device, and judging whether the following conditions are met: the temperature parameter of the first temperature sensor detected in real time is greater than a first preset value set in the accommodation area corresponding to the first temperature sensor in the current working state, and the temperature parameter of the second temperature sensor detected is greater than a second preset value set in the accommodation area corresponding to the second temperature sensor in the current working state; when the conditions are met, acquire a difference value between the temperature parameter of the first temperature sensor and the temperature parameter of the second temperature sensor, and send a speed adjustment instruction corresponding to the difference value to the external fan.

Further, a cooling gas is provided in the accommodation area.

Further, a fitting plate extends from the tube upper cover or the tube lower cover; the projection device further includes a semiconductor chilling plate, and a hot end surface of the semiconductor chilling plate abuts against the fitting plate.

A projection device is provided, adopting the heat conduction unit described in the above solutions. The projection device includes a light source, a light valve, a heat conduction unit, an external fan, an internal fan, a projection lens, an upper housing, a middle housing and a lower housing. The heat conduction unit directly ventilates and conducts heat for the light valve, and the tube separates the space formed in the housing of the projection device from the heat conduction channel, forming two heat conduction spaces, namely, an inner space and an outer space. When the projection device is running, the internal fan at the lower side of the heat conduction unit is running, and a large amount of heat generated by irradiating light to the light valve is sucked into the tube, and the heat is exchanged with the cold air sucked by the external fan from the outside of the projector through the tube wall with good thermal conductivity, so that the heat generated by the light valve can be continuously conducted to the outside, thus ensuring the smooth operation of the projection device.

There are two heat conducting spaces formed inside and outside the heat conduction channel of the projection device of the present application. Compared with the prior art, the present application reduces the use of fins and thus greatly reduces the cost. The application makes full use of the two heat conducting spaces inside and outside the heat conduction channel, and has a compact overall structure, which brings good heat conduction effect to those miniaturized and high-power projectors.

Figure 1:
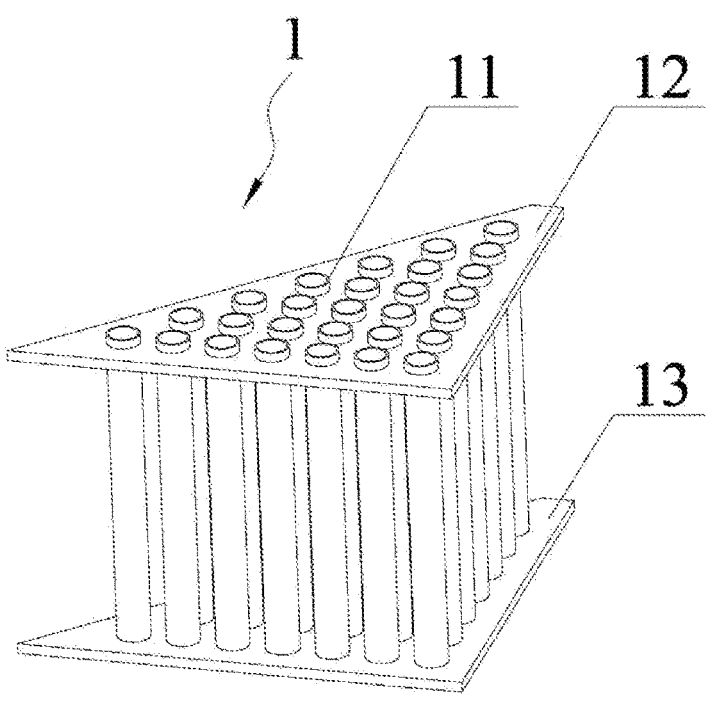
FIG. 1 is a top perspective view of a heat conduction unit of a first embodiment according to the present application.

Reference signs in the drawings are as follows.

1. Heat conduction unit; 11. Tube set; 12. Tube upper cover; 13. Tube lower cover; 111. Groove; 2. Light valve; 3. Light source; 4. Upper housing; 5. Middle housing; 6. Lower housing; 7. External fan; 8. Internal fan; 9. Projection lens; 10. Temperature control board; 14. First temperature sensor; 15. Second temperature sensor.

DETAILED DESCRIPTION OF DISCLOSED EMBODIMENTS

The technical solution in the embodiment of the present application will be described clearly and completely with the attached drawings. It is apparent that the disclosed embodiments are merely parts of the embodiments of the present application, not the whole. Components of the present invention, as generally described and illustrated in the Figures herein, may be arranged and designed in a wide variety of different configurations. Thus, the following detailed description of the embodiments of the present application, as presented in the Figures, is not intended to limit the scope of the application, as claimed, but is merely representative of selected embodiments of the application. Based on the embodiments of the present application, all other embodiments obtained by those skilled in the art under the condition of replacing, modifying or combining the technical features are still within the protection scope of the present application.

Embodiment 1

Figure 2:
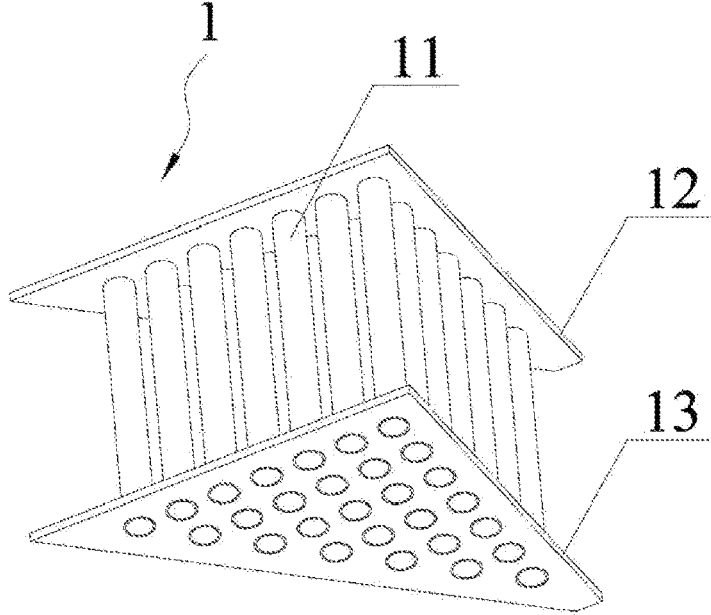
FIG. 2 is a bottom perspective view of a heat conduction unit of a first embodiment according to the present application.

As shown in FIGS. 1 to 2, the application provides a heat conduction unit 1 of a light valve 2, the unit is used for conducting heat for light valve. The heat conduction unit 1 includes a tube set 11, a tube upper cover 12 and a tube lower cover 13, and the tube set 11 includes a plurality of tubes. The central axis of the tube set 11 is perpendicular or inclined to the surface of the 1 tube upper cover 2 or the tube lower cover 13, and the tube set 11 is fixedly connected with the tube upper cover 12 and the tube lower cover 13. The tube separates the space formed in the housing of the projection device from the heat conduction channel.

Embodiment 2

As shown in FIGS. 1 to 2, the heat conduction unit 1 of the light valve 2 in this embodiment includes a tube set 11, a tube upper cover 12 and a tube lower cover 13, and the tube set 11 includes 28 tubes. Tube upper cover 12 is parallel to the surface of tube lower cover 13, and the central axis of tube set 11 is perpendicular to the surface of tube upper cover 12 or tube lower cover 13. The tube set 11 is fixedly connected with the tube upper cover 12 and the tube lower cover 13 in an interference fit manner by riveting. The tube separates the space formed in the housing of the projection device from the heat conduction channel, and the material of tube has good thermal conductivity and is made of aluminum.

Further, the cross section of the tube is circular, and 28 circles formed by the tube set on the surface of the tube upper cover or the tube lower cover are arranged in a matrix.

Embodiment 3

Figure 3:
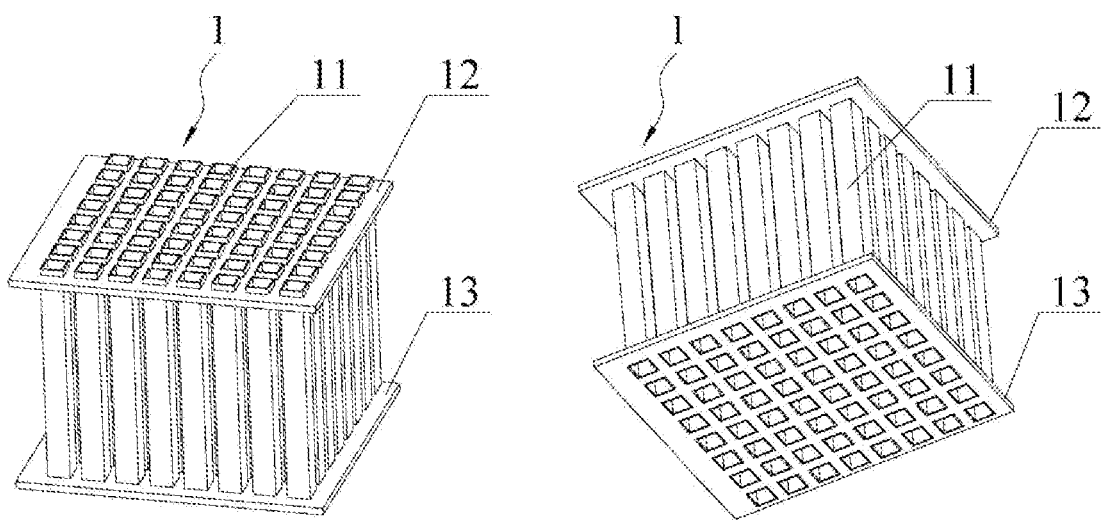
FIG. 3 is a top and bottom perspective view of a heat conduction unit of a second embodiment according to the present application.

As shown in FIG. 3, the heat conduction unit 1 of the light valve 2 in this embodiment includes a tube set 11, a tube upper cover 12 and a tube lower cover 13, and the tube set 11 includes 64 tubes. Tube upper cover 12 is parallel to the surface of tube lower cover 13, and the central axis of tube set 11 is perpendicular to the surface of tube upper cover 12 or tube lower cover 13. Tube set 11 is welded with tube upper cover 12 and tube lower cover 13. The tube separates the space formed in the housing of the projection device from the heat conduction channel, and the material of tube has good thermal conductivity and is made of copper.

Further, the cross section of the tube is square, and 64 squares formed by the tube set on the surface of the tube upper cover or the tube lower cover are arranged in a matrix.

Embodiment 4

Figure 4:
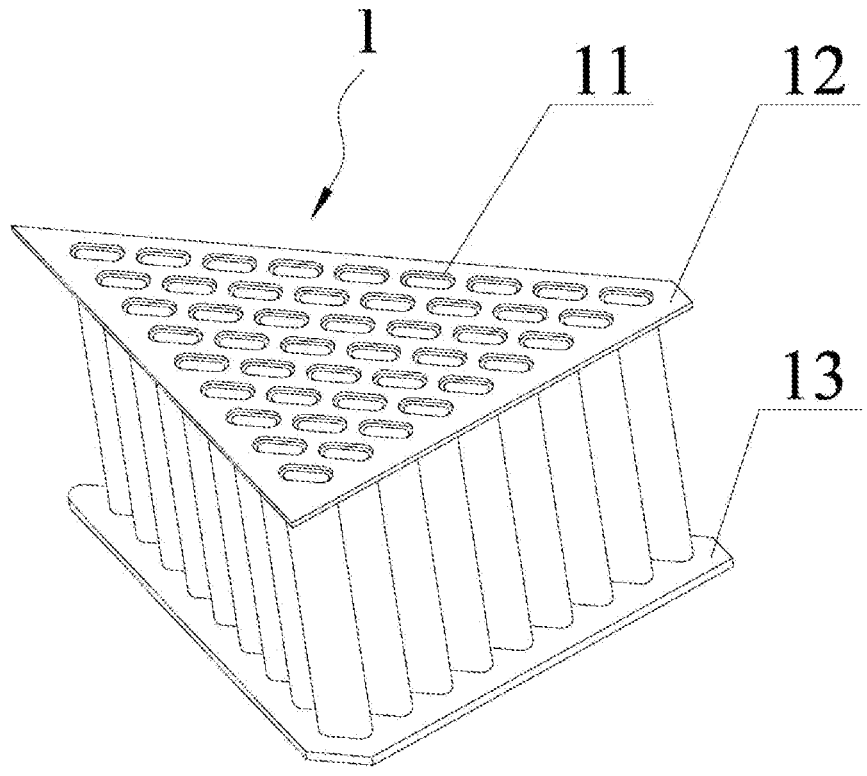
FIG. 4 is a top perspective view of a heat conduction unit of a third embodiment according to the present application.

As shown in FIG. 4, the heat conduction unit 1 of the light valve 2 in this embodiment includes a tube set 11, a tube upper cover 12 and a tube lower cover 13, and the tube set 11 includes 45 tubes. Tube upper cover 12 is parallel to the surface of tube lower cover 13, and the central axis of tube set 11 is perpendicular to the surface of tube upper cover 12 or tube lower cover 13. The tube set 11 is fixedly connected with the tube upper cover 12 and the tube lower cover 13 in the form of expansion joint, the tube separates the space formed in the housing of the projection device from the heat conduction channel, and the material of the tube has good thermal conductivity and is made of aluminum alloy.

Furthermore, the cross section of the tube is rectangular with rounded corners, and 45 rounded rectangles formed by the tube set on the surface of the tube upper cover or the tube lower cover are arranged in a regular hexagon.

Embodiment 5

Figure 5:
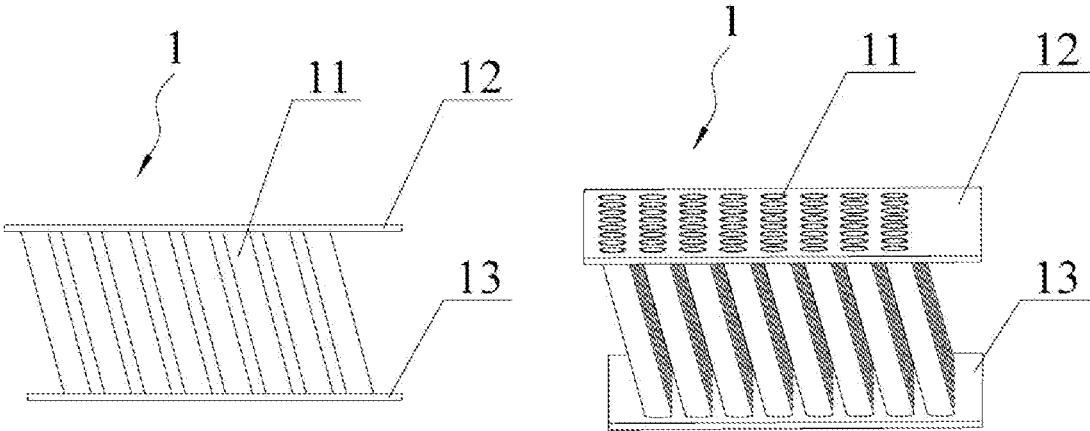
FIG. 5 is a front and top perspective view of a heat conduction unit of a fourth embodiment according to the present application.

As shown in FIG. 5, the heat conduction unit 1 of the light valve 2 in this embodiment includes a tube set 11, a tube upper cover 12 and a tube lower cover 13, and the tube set 11 includes 64 tubes. The tube upper cover 12 is parallel to the surface of the tube lower cover 13, and the central axis of the tube set 11 is inclined to the surface of the tube upper cover 12 or the tube lower cover 13 at an inclination angle of 10 degrees. Tube set 11 is welded with tube upper cover 12 and tube lower cover 13. The tube separates the space formed in the housing of the projection device from the heat conduction channel, and the material of tube has good thermal conductivity and is made of aluminum alloy.

Further, the cross section of the tube is circular, and 64 circles formed by the tube set on the surface of the tube upper cover or the tube lower cover are arranged in a matrix.

Embodiment 6

Figure 6:
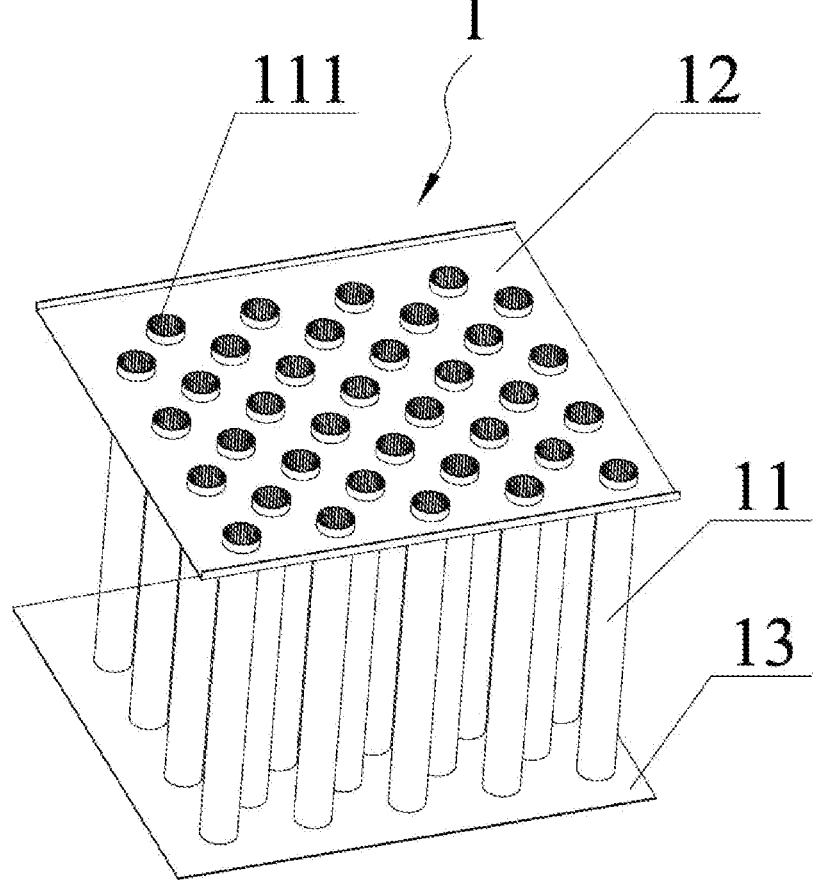
FIG. 6 is a top perspective view of a heat conduction unit of a fifth embodiment according to the present application.

As shown in FIG. 6, the heat conduction unit 1 of the light valve 2 in this embodiment includes a tube set 11, a tube upper cover 12 and a tube lower cover 13, and the tube set 11 includes 36 tubes. The tube upper cover 12 is parallel to the surface of the tube lower cover 13, the central axis of the tube set 11 is perpendicular to the surface of the tube upper cover 12 or the tube lower cover 13. The tube set 11 is fixedly connected with tube upper cover 12 and tube lower cover 13 in the form of expansion joint. Furthermore, the inner wall of the tube is provided with 30 grooves 111 evenly distributed along the inner wall, so as to increase the area of inner surface of tube and better realize heat conduction in the tube. The tube separates the space formed in the housing of the projection device from the heat conduction channel, and the tube is made of high thermal conductivity polymer material synthesized by resin and ceramic particles, which has better thermal conductivity. Or, further, the inner wall of the tube is provided with a plurality of flaky protrusions extending along the center of the tube. And due to the flaky protrusions, the contact area of the inner surface of the tube can be increased to better realize heat conduction in the tube, and the tube separates the space formed in the housing of the projection device from the heat conduction channel. Furthermore, a groove is opened along the axial direction of the tube, and the cross section formed by the groove is a polygonal shape.

Further, the cross section of the tube is circular, and 36 circles formed by the tube set on the surface of the tube upper cover or the tube lower cover are arranged in a regular hexagon.

Figure 7:
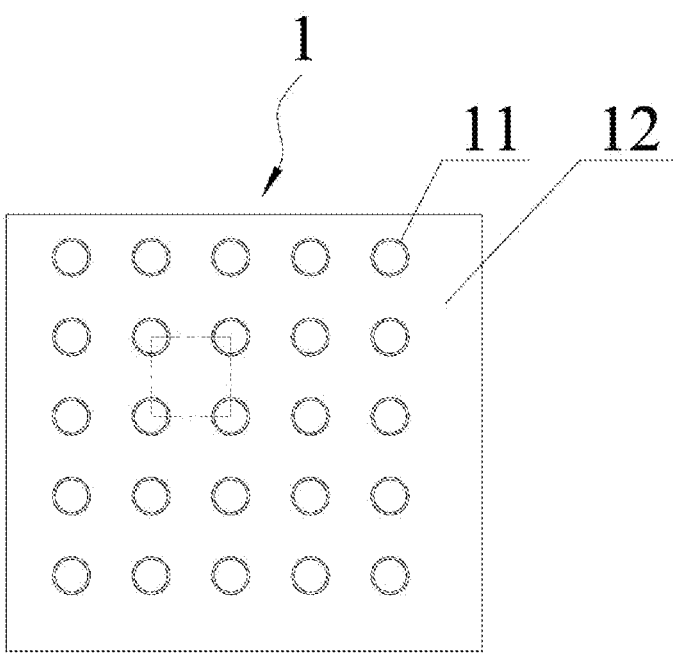
FIG. 7 is a schematic diagram of a first arrangement mode of the tube set of the heat conduction unit in the tube upper cover.
Figure 8:
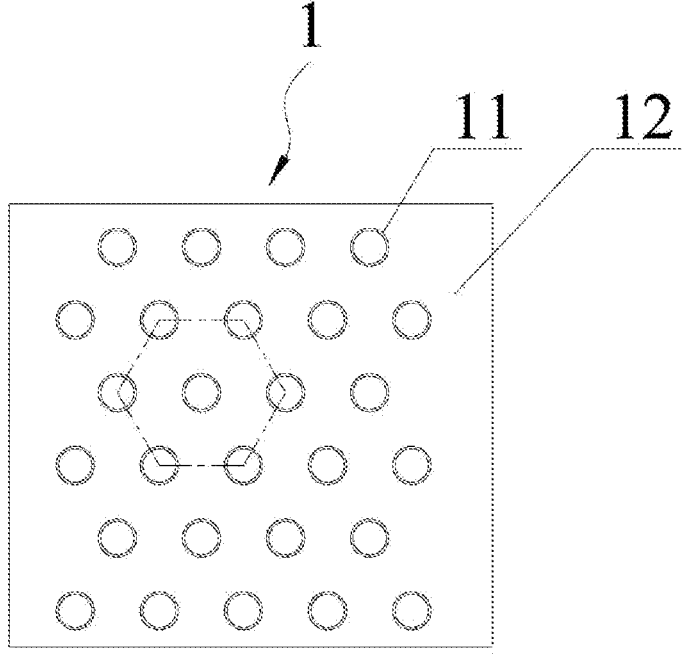
FIG. 8 is a schematic diagram of a second arrangement mode of the tube set of the heat conduction unit in the tube upper cover.
Figure 9:
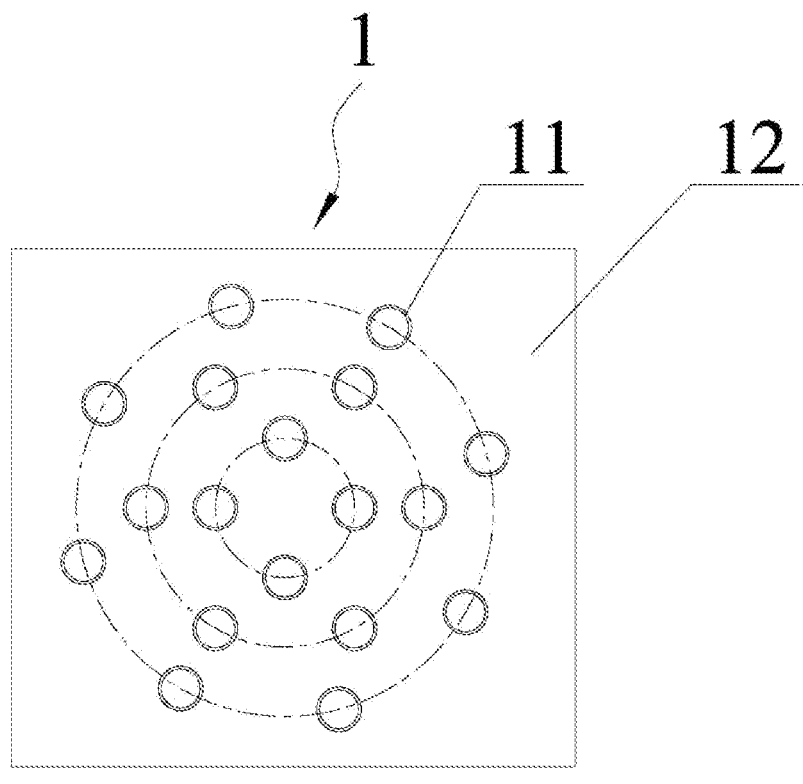
FIG. 9 is a schematic diagram a third arrangement mode of the tube set of the heat conduction unit in the tube upper cover.

FIG. 7, FIG. 8, and FIG. 9 show three arrangement modes of several cross-sectional shapes formed on the surface of the tube upper cover by the tube set in the heat conduction unit 1, which may be arranged in matrix, regular polygon, and ring respectively.

Embodiment 7

Figure 10:
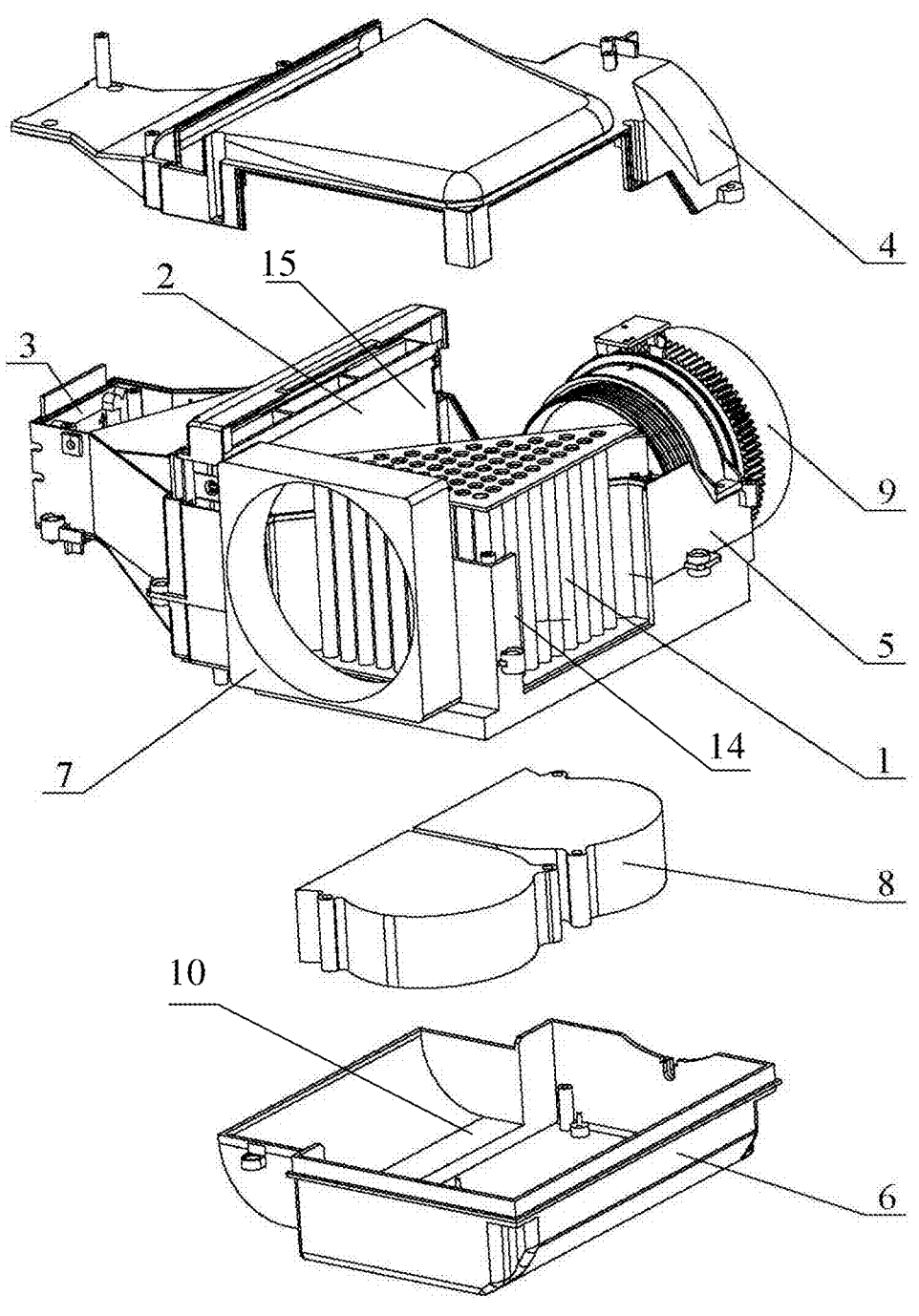
FIG. 10 is a top perspective view of a projection device using the heat conduction unit.
Figure 11:
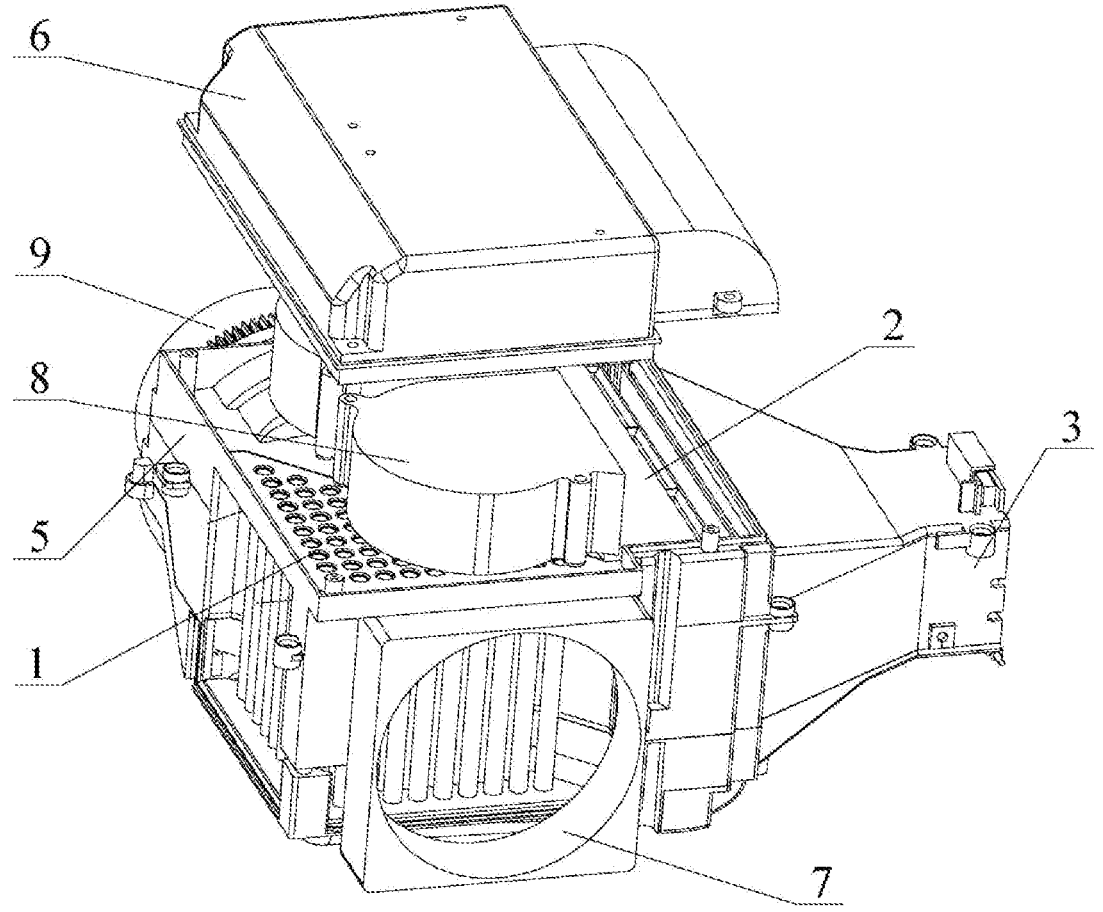
FIG. 11 is a bottom perspective view of a projection device using the heat conduction unit.

As shown in FIG. 10 and FIG. 11, the embodiment of the present application provides a projection device, which includes any one of the above-mentioned heat conduction unit 1. The projection device adopting one of the above-mentioned technical solutions also includes a light source 3, a light valve 2, a heat conduction unit 1, an external fan 7, an internal fan 8, a projection lens 9, an upper housing 4, a middle housing 5 and a lower housing 6. When the projection device is running, the internal fan 8 at the lower side of the heat conduction unit 1 is running, and a large amount of heat generated by irradiating light to the light valve 2 is sucked into the tube, and the heat is exchanged with the cold air sucked by the external fan 7 from the outside of the projector through the tube wall with good thermal conductivity, so that the heat generated by the light valve can be continuously conducted to the outside, thus ensuring the smooth operation of the projection device. Specifically, the tube upper cover 12 and tube lower cover 13 of the heat conduction unit 1 face the upper housing 4 and the lower housing 6, respectively. The inner walls of a plurality of tubes of the heat conduction unit 1 are communicated with the accommodation area where the light valve 2 is located and the accommodation area is sealed. An internal fan 8 is arranged between the lower housing 6 and the tube lower cover 13. The outer walls of a plurality of tubes of the heat conduction unit 1 are communicated with the outside air, and an external fan 7 is installed at the side of the middle housing 5 facing the tube set 11.

Compared with the prior art, fins are reduced, meanwhile, the inner walls of a plurality of tubes of the heat conduction unit 1 are communicated with the accommodation area where the light valve 2 is located and the accommodation area is sealed, and an internal fan 8 is arranged between the lower housing 6 and the tube lower cover 13; the outer walls of a plurality of tubes of the heat conduction unit 1 are communicated with the outside air, forming two heat dissipation spaces inside and outside the heat conduction channel. Hence the projection device can make full use of the two heat conducting spaces inside and outside the heat conduction channel, and has a compact overall structure, which brings good heat conduction effect to those miniaturized and high-power projectors.

Further, the internal fan 8 is a vortex fan. In this embodiment, combined with the special design of the two heat dissipation spaces inside and outside the heat conduction channel, the internal fan 8 has a specific function as a vortex fan. The internal fan 8 can make use of the characteristics of eddy current and vertical wind direction to better increase the gas flow in the tube and increase the convection effect in the duct, thus enhancing the heat dissipation effect.

Further, the projection device further includes a temperature control board 10, a first temperature sensor 14 arranged on the outer wall or the inner wall of the tube, and a second temperature sensor 15 arranged on the light valve 2; and the first temperature sensor 14, the second temperature sensor 15 and the external fan 7 are electrically connected to the temperature control board 10, and the temperature control board 10 intelligently adjusts a rotational speed of the external fan according to temperature parameters of the first temperature sensor 14 and the second temperature sensor 15. In this way, in order to further improve the temperature control intelligence and ensure the temperature control of the projection device, the temperature inside or outside the tube of the heat conduction unit 1 for the light valve 2 is also monitored, and the temperature of the light valve 2 is also monitored, so that the temperature control board 10 can intelligently adjust the rotational speed of the external fan according to the temperature parameters of the first temperature sensor 14 and the second temperature sensor 15.

Further, the temperature control board 10 is configured to determine a current working state of the projection device, and judging whether the following conditions are met: the temperature parameter of the first temperature sensor 14 detected in real time is greater than a first preset value set in the accommodation area corresponding to the first temperature sensor 14 in the current working state, and the temperature parameter of the second temperature sensor 15 detected is greater than a second preset value set in the accommodation area corresponding to the second temperature sensor 15 in the current working state; when the conditions are met, acquire a difference value between the temperature parameter of the first temperature sensor 14 and the temperature parameter of the second temperature sensor 15, and send a speed adjustment instruction corresponding to the difference value to the external fan.

In this embodiment, different working states of the projection device are set, including the intelligent working state. In the intelligent working state, the operating conditions of the projection device will be judged in real time, that is, whether the following conditions are met is judged: the temperature parameter of the first temperature sensor 14 detected in real time is greater than a first preset value set in the accommodation area corresponding to the first temperature sensor 14 in the current working state, and the temperature parameter of the second temperature sensor 15 detected is greater than a second preset value set in the accommodation area corresponding to the second temperature sensor 15 in the current working state. It should be understood that in order to reasonably monitor the heat dissipation effect of the heat conduction unit 1 of the present application, the first temperature sensor 14 and the second temperature sensor 15 respectively represent the temperature conditions of two heat dissipation spaces, and the temperature of the heat dissipation space where each of the two areas is located represents the heat dissipation effect of the heat conduction unit 1. Therefore, in this embodiment, a first preset value and a second preset value of temperature are respectively set for two areas. When they are both greater than the set preset values, the difference value between the temperature parameters of the first temperature sensor 14 and the second temperature sensor 15 is obtained, and speed adjustment instructions corresponding to the difference value are sent to the external fan 7.

For example, if the difference value between the temperature parameters of the first temperature sensor 14 and the second temperature sensor 15 is greater than a certain value, the corresponding speed adjustment instruction is to "increase the rotational speed of the external fan 7". If the difference value between the temperature parameters of the first temperature sensor 14 and the second temperature sensor 15 is less than a certain value, the corresponding speed adjustment instruction is to "decrease the rotational speed of the external fan 7".

In other solution, there may be other control modes as follows.

For example, if the difference value between the temperature parameters of the first temperature sensor 14 and the second temperature sensor 15 is greater than a certain value, the corresponding speed adjustment instruction is to "increase the rotation speed of the internal fan 8". if the difference between the temperature parameters of the first temperature sensor 14 and the second temperature sensor 15 is less than a certain value, the corresponding speed adjustment instruction is to "decrease the rotation speed of the internal fan 8". It should also be noted that in order to achieve more refined control, the difference value may be further refined and broken down. For example, the difference value may consist of multiple range values, and different range values correspond to different speed adjustment instructions to control the rotational speed of the internal fan 8. In this way, more precise heat dissipation control can be realized for the projection device, and the heat dissipation effect can be improved.

For example, if the difference value between the temperature parameters of the first temperature sensor 14 and the second temperature sensor 15 is less than a certain value, and the temperature parameter of the first temperature sensor 14 is less than a set value, the internal fan 8 may be shut down or the rotational speed of the internal fan 8 may be reduced. If the difference value between the temperature parameters of the first temperature sensor 14 and the second temperature sensor 15 is less than a certain value, but the temperature parameter of the first temperature sensor 14 is still greater than the set value, the operation of the internal fan 8 may be maintained or the rotational speed of the external fan 7 may be increased. Therefore, the temperature of the area in the tube is ensured to be within a reasonable temperature range, so that the two heat dissipation spaces can exchange heat more sensibly and the heat dissipation performance would be improved.

For example, if the difference value between the temperature parameters of the first temperature sensor 14 and the second temperature sensor 15 is greater than a certain value and the temperature parameter of the first temperature sensor 14 is still greater than a set value, the rotational speed of the internal fan 8 and the rotational speed of the external fan 7 may be increased. If the difference value between the temperature parameters of the first temperature sensor 14 and the second temperature sensor 15 is greater than a certain value and the temperature parameter of the first temperature sensor 14 is still less than the set value, the rotational speed of the internal fan 8 may be increased while the rotational speed of the external fan 7 may be kept unchanged. So the power consumption can be reduced as much as possible while ensuring the heat dissipation effect.

For example, if the difference value between the temperature parameters of the first temperature sensor 14 and the second temperature sensor 15 is greater than a certain value, the startup time of the projection device is judged, and if the startup time exceeds a certain time, the rotational speeds of the internal fan 8 and the external fan 7 are simultaneously increased.

It should be noted that, in this embodiment, the above-mentioned difference values and preset values may be obtained according to the test calibration, and are not specifically limited.

In an embodiment, a cooling gas is provided in the accommodation area where the light valve is located. For example, the cooling gas may be nitrogen gas, carbon dioxide gas, etc., and is not specifically limited. By providing the cooling gas in the accommodation area where the light valve is located, and because the accommodation area where the light valve is located is in a sealed environment, together with the vortex arrangement of the previous embodiment, the heat dissipation effect in the area can be increased, and the heat dissipation performance is improved.

In an embodiment, a fitting plate may be provided, which extends from the tube upper cover or the tube lower cover, and the projection device further includes a semiconductor chilling plate, and the hot end face of the semiconductor chilling plate is attached to the fitting plate, thereby further improving the heat dissipation effect.

In the description of the present application, it should be noted that the terms "first", "second", "third", "fourth" and "fifth" are only used for descriptive purposes and cannot be understood as indicating or implying relative importance. For those skilled in the art, the specific meanings of the above terms in the present application may be understood in specific situations. In addition, in the description of the present application, unless otherwise specified, "multiple" means two or more.

Although embodiments of the present application have been shown and described, those skilled in the art would understand that many changes, modifications, substitutions and variations may be made to these embodiments without departing from the principles and purposes of the present application, the scope of which is defined by the claims and their equivalents.

What is claimed is:

1. A projection device, comprising a heat conduction unit, used for conducting heat for light valves, wherein the heat conduction unit comprises a tube set, a tube upper cover and a tube lower cover; the tube set comprises a plurality of tubes, a central axis of the tube set is vertical or inclined to a surface of the tube upper cover or the tube lower cover, and the tube set is fixedly connected with the tube upper cover and the tube lower cover;

an inner wall of the tube is provided with a plurality of grooves; or the inner wall of the tube is provided with a plurality of flaky protrusions extending along the center of the tube;

wherein the projection device further comprises a light source, a light valve, an external fan, an internal fan, a projection lens, an upper housing, a middle housing and a lower housing; the upper housing, the middle housing and the lower housing form an accommodating cavity, and the light valve and the heat conduction unit are arranged in the accommodating cavity;

the tube upper cover and the tube lower cover of the heat conduction unit face the upper housing and the lower housing respectively, inner walls of the plurality of tubes of the heat conduction unit are communicated with an accommodation area where the light valve is located and the accommodation area is sealed, and the internal fan is arranged between the lower housing and the tube lower cover; and outer walls of the plurality of tubes of the heat conduction unit are communicated with outside air, and the external fan is installed at a side of the middle housing facing the tube set.

2. The projection device of claim 1, wherein the projection device further comprises a temperature control board, a first temperature sensor arranged on the outer wall or the inner wall of the tube, and a second temperature sensor arranged on the light valve; and the first temperature sensor, the second temperature sensor and the external fan are electrically connected to the temperature control board, and the temperature control board intelligently adjusts a rotational speed of the external fan according to temperature parameters of the first temperature sensor and the second temperature sensor.

3. The projection device of claim 2, wherein the temperature control board is configured to determine a current working state of the projection device, and judging whether the following conditions are met: the temperature parameter of the first temperature sensor detected in real time is greater than a first preset value set in the accommodation area corresponding to the first temperature sensor in the current working state, and the temperature parameter of the second temperature sensor detected is greater than a second preset value set in the accommodation area corresponding to the second temperature sensor in the current working state; when the conditions are met, acquire a difference value between the temperature parameter of the first temperature sensor and the temperature parameter of the second temperature sensor, and send a speed adjustment instruction corresponding to the difference value to the external fan.

4. The projection device of claim 1, wherein a cooling gas is provided in the accommodation area, and the internal fan is a vortex fan.

5. The projection device of claim 1, wherein a fitting plate extends from the tube upper cover or the tube lower cover; the projection device further comprises a semiconductor chilling plate, and a hot end surface of the semiconductor chilling plate abuts against the fitting plate.

6. The projection device of claim 1, wherein the tube set is fixedly connected with the tube upper cover and the tube lower cover by welding or interference fit.

7. The projection device of claim 1, wherein the tube is made of metal, comprising any one of aluminum, copper and aluminum alloy.

8. The projection device of claim 1, wherein a plurality of cross sections formed by the tube set on the surface of the tube upper cover or the tube lower cover are arranged in a matrix shape or a regular polygon shape; or a plurality of cross sections formed by the tube set on the surface of the tube upper cover or the tube lower cover are arranged in a ring shape.

\*    \*    \*    \*    \*